United States Patent [19]

An

[11] Patent Number: 5,719,735
[45] Date of Patent: Feb. 17, 1998

[54] DEVICE AND METHOD FOR PROTECTING A CRT SCREEN

[75] Inventor: Jong-Ki An, Gumi, Rep. of Korea

[73] Assignee: LG Semicon Co., Ltd., Chungcheongbuk-do, Rep. of Korea

[21] Appl. No.: 659,563

[22] Filed: Jun. 10, 1996

[30] Foreign Application Priority Data

Jun. 30, 1995 [KR] Rep. of Korea ............. 95 18719

[51] Int. Cl.$^6$ .................................................. H02H 9/00
[52] U.S. Cl. ............................ 361/78; 361/54; 315/380
[58] Field of Search ........................... 361/78, 113, 91, 361/54; 315/380, 381, 386

[56] References Cited

U.S. PATENT DOCUMENTS 3,629,645  12/1971  Taylor ........................ 315/20

OTHER PUBLICATIONS

"LM1203A 100 MHz RGB Video Amplifier System"; Mar. 1992, *National Semiconductor*; p. 81.

*Primary Examiner*—Fritz Fleming
*Assistant Examiner*—Sally C. Medley

[57] ABSTRACT

A device and method for protecting a CRT screen. The device includes first and second amplifying circuits for amplifying a video signal input thereto and outputting an amplified signal; a buffer circuit for buffering the amplified signal and generating an output signal for a screen; a Vcc voltage sensing circuit for detecting a drop in a Vcc voltage during a power cut-off stage; and a transistor being turned on based on the detection and being connected at the input stage of the buffer circuit for eliminating AC and DC components of the amplified signal outputted from the second amplifying circuit so as to eliminate formation of a spot on the screen during the power cut-off stage.

20 Claims, 3 Drawing Sheets

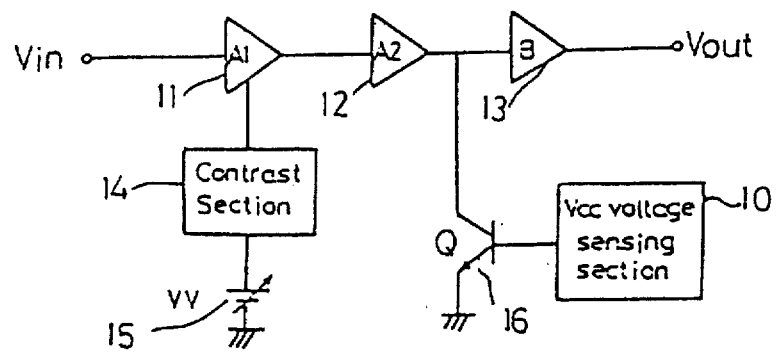
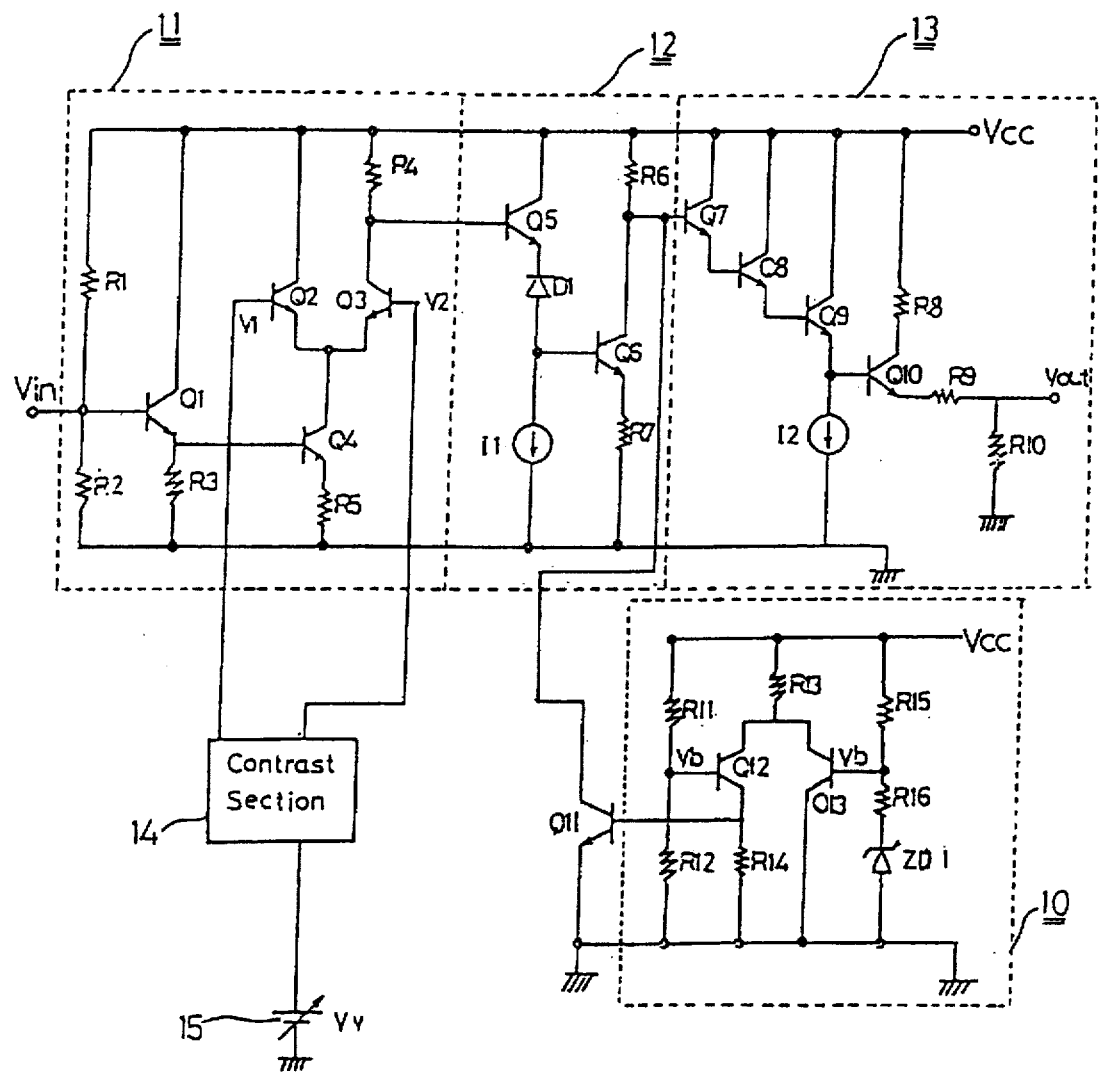

DEVICE AND METHOD FOR PROTECTING A CRT SCREEN

BACKGROUND OF THE INVENTION

1. Field of the Invention

The present invention relates to a device and method for protecting a CRT screen, and more particularly to a CRT screen protective circuit and a screen protecting method suitable for eliminating degradation of a CRT screen caused by a bright spot appearing at the center of the CRT screen during a power-off operation of a monitor or television (TV).

2. Description of the Background Art

A conventional CRT screen protective circuit has a construction as illustrated in FIG. 1.

Reference numerals 11 and 12 denote first and second amplifiers, respectively, in which the first amplifier 11 amplifies a video signal input thereto and the amplification magnitude of the first amplifier 11 is adjusted by a contrast section 14.

The contrast section 14 supplies a terminal voltage of a variable voltage device 15 to control the first amplifier 11. It changes the voltage range of the first amplifier 11 for the purposes of adjusting the amplification magnitude (gain) of the first amplifier 11.

The gain of the first amplifier 11 is also controlled by a transistor Q11. The Vcc voltage sensing section 10 detects a voltage drop in the Vcc voltage supplied to the circuit and turns on or off the transistor Q11 based on the detection. Turning on the transistor Q11 grounds the gain of the amplifier 11.

The signal amplified by the first amplifier 11 is amplified again by the second amplifier 12. A buffer 13 transfers the signal amplified by the second amplifier 12 to an output terminal Vout without amplifying the signal. However, a DC voltage component of the signal is amplified.

The conventional CRT screen protective circuit constructed as shown in FIG. 1 operates as follows.

The video signal received via an input terminal Vin is amplified by the first amplifier 11 and the second amplifier 12, and is outputted at the output terminal Vout through the buffer 13. Then, the output signal is processed by a signal processing circuit (not shown) and a third amplifier 16, and is supplied to a CRT 17 for being displayed on a screen.

When the monitor or TV is turned off, power is cut off under the normal operation. In this case, the Vcc voltage sensing section 10 senses the voltage drop in the Vcc voltage and supplies an output voltage for turning on the transistor Q11. By doing so, the contrast section 14 grounds a gain control signal supplied to the first amplifier 11, which reduces the amplification magnitude of the first amplifier 11.

FIG. 2 is a detailed circuit diagram of the conventional CRT screen protective circuit as shown in FIG. 1.

In FIG. 2, reference numerals R1-R16 denote resistors which are used for current limiting, voltage division and a biasing operation, Q1-Q13 are transistors, 10-15 designate the same elements shown in FIG. 1, I1 and I2 are constant current sources, D1 is a diode, and ZD1 is a Zener diode.

The operation of the circuit constructed as shown in FIG. 2 will be described below.

When the video signal is received via the input terminal Vin, the input video signal is amplified in transistor Q1 and supplied to transistor Q4. The collector of transistor Q4 is supplied with the voltage Vcc via transistors Q2 and Q3, and the collector of transistor Q3 functions as an output of the first amplifier 11.

At this time, the voltage drop across the resistor R4 is varied by biasing the base voltages V1 and V2 of transistors Q2 and Q3. The voltage drop occurs due to a difference between the base voltages V1 and V2 of transistors Q2 and Q3. The contrast voltage supplied by the contrast section 14 is lowered by controlling the variable voltage 15. That is, when the voltage V2 is lowered by adjusting the variable voltage device 15, V1>>V2 is obtained. Then, the collector current of transistor Q3 is reduced, which decreases the voltage drop across the resistor R4. As a result, the gain of the first amplifier 11 decreases. If the contrast voltage is increased by adjusting the variable voltage device 15, the operation is carried out in the reverse way.

The signal outputted from the first amplifier 11 includes a DC level which is amplified in transistor Q6 of the second amplifier 12. The amplified output of transistor Q6 is supplied to the output terminal Vout via transistors Q7, Q8, Q9 and Q10. Thus, the signal outputted from the terminal Vout includes the DC voltage of the input stage multiplied by the gain of the amplifiers.

When the power is cut off under this state, the Vcc voltage is lowered. Also, since a base voltage of transistor Q13 of the Vcc voltage sensing section 10 is fixed and a base voltage of transistor Q12 is decreased according to the resistance ratio of resistors R11 and R12, the base voltage Vb of transistor Q12 becomes less than the base voltage Vb of transistor Q3 (Vb(Q12)<Vb(Q13)). This causes transistor Q12 to supply current to the base of transistor Q11.

As a result, after the power is cut-off, transistor Q11 is turned on to decrease the base voltage V2 of transistor Q3, which drops the gain of the first amplifier 11. Thereafter, the video signal (AC component) no longer appears in the second amplifier 12 and buffer 13. Consequently, as the picture size decreases from the screen during the power off stage, the picture gradually disappears from the screen.

In such a conventional circuit, the gain of the first amplifier 11 is dropped when the Vcc voltage is decreased and the AC gain of the output stage is decreased. However, the DC voltage of the output remains unchanged. Thus, it becomes difficult to completely eliminate a spot which is formed as the picture disappears from the screen.

SUMMARY OF THE INVENTION

The present invention is devised to solve the above-described problems of a conventional, insufficient spot eliminating operation. Accordingly, it is an object of the present invention to provide a device and method capable of almost completely eliminating the spot by reducing both the AC gain and the DC voltage of an output stage altogether.

To achieve the above objects of the present invention, there is provided a device and method for protecting a CRT screen which senses a power cut-off state via a Vcc voltage sensing section and grounds an input of a buffer circuit based on an output signal from the Vcc voltage sensing section, thereby eliminating the DC and AC components of the signal to be outputted at the output terminal and thereby solving the spot phenomenon and preventing the CRT screen.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly describing the embodied invention, a device for protecting a CRT screen, includes amplifying means for amplifying a video signal input thereto and outputting an amplified signal; buffer means for buffering the amplified signal and generating an output signal for a screen; and detection means for eliminating AC and DC components of the amplified signal outputted from the amplifying means so as to eliminate formation of a spot on the screen during a power cut-off stage.

Furthermore, a method of protecting a CRT screen, comprises the steps of amplifying by amplifying means a video signal input and outputting an amplified signal; buffering the amplified signal and generating an output signal for a screen; and eliminating AC and DC components of the amplified signal outputted from the amplifying means so as to eliminate formation of a spot on the screen during a power cut-off stage.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram showing a CRT screen protecting device according to the embodiments of the present invention; and FIG. 4 is a circuit diagram showing the CRT screen protecting device of FIG. 3 according to the embodiments of the present invention.

DETAILED DESCRIPTION OF THE PREFERRED EMBODIMENTS

Figure 1:
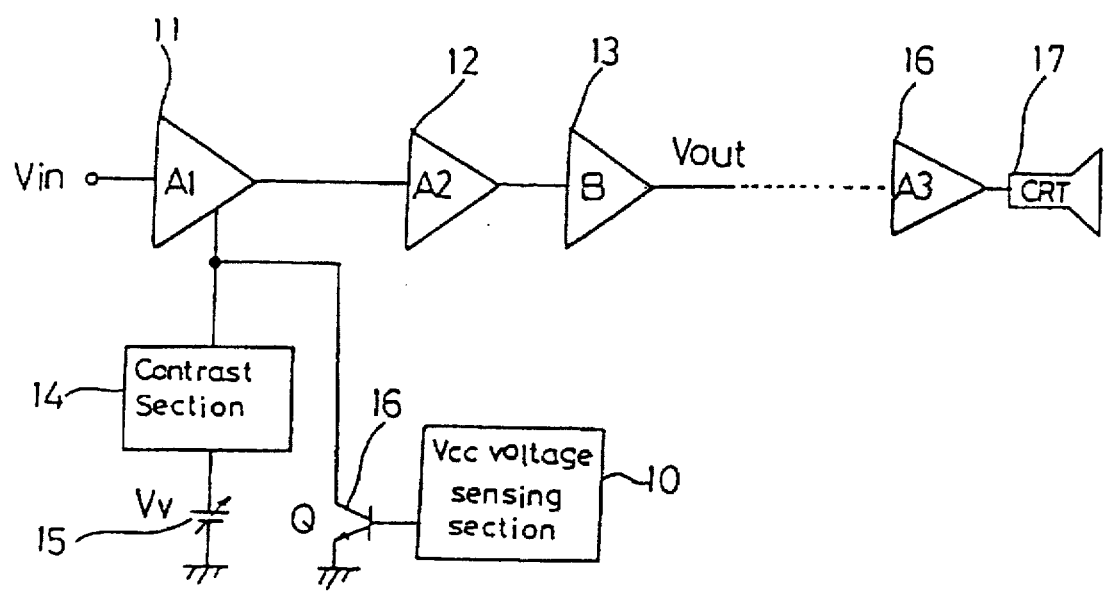
FIG. 1 is a block diagram showing a conventional CRT screen protective circuit.
Figure 2:
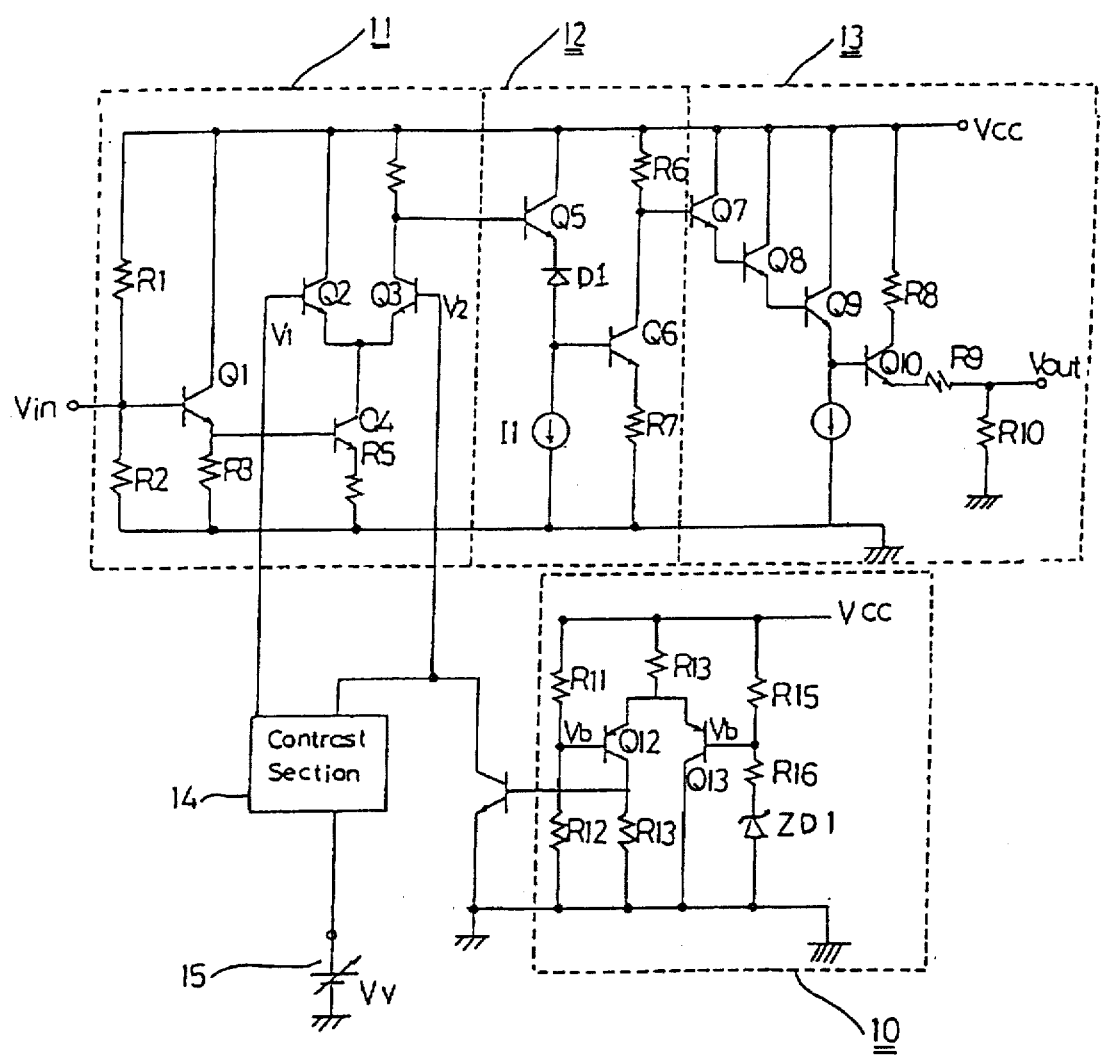
FIG. 2 is a circuit diagram showing the conventional CRT screen protective circuit of FIG. 1.

A CRT screen protecting device according to the present invention has a construction as shown in FIG. 3.

In the screen protecting device, a video signal is input to a first amplifying circuit 110 through an input terminal Vin, in which the first amplifying circuit 110 amplifies the video signal. The amplification magnitude of the first amplifying circuit 110 is adjusted by a signal from a contrast section 140.

The contrast section 140 supplies a terminal voltage Vv from a variable voltage device 150 to the first amplifying circuit 110. This controls the base voltages of the transistors used in the first amplifying circuit 110 so that the amplification magnitude of the first amplifying circuit 110 can be adjusted.

A second amplifying circuit 120 receives an output signal from the first amplifying circuit 110 through the base of transistor Q5', and is connected to a buffer circuit 130 for generating an output signal at an output terminal Vout. A Vcc voltage sensing section 100 generates a detection signal for sensing a drop in the Vcc voltage. The detection signal from the voltage sensing section 100 selectively turns on transistor Q11'. Here, the collector of transistor Q11' is connected to an input terminal of the buffer circuit 130.

The buffer circuit 130 transfers the signal amplified in the second amplifying circuit 120 to the output terminal Vout without amplifying the signal. However, the buffer circuit 130 functions to vary any DC voltage input thereto.

The CRT screen protective circuit constructed as shown in FIG. 3 operates as follows.

The video signal received via the input terminal Vin is amplified in the first amplifying circuit 110 and the second amplifying circuit 120. The amplified signal is processed through the buffer circuit 130 and output at the output terminal Vout. Then, the resulting signal passes through a signal processing circuit (not shown) and the third amplifier 16, and is output to the CRT 17 (shown in FIG. 1) for being displayed on the screen.

At this time, once the T.V. or monitor is turned off, the power supply is cut-off. The Vcc voltage sensing section 100 detects the drop in the Vcc voltage and supplies an output voltage for turning on transistor Q11'. When the transistor Q11' is turned on, it grounds the input of the buffer circuit 130 through its collector-emitter.

By doing so, the output of the second amplifying circuit 120 and the input of the buffer circuit 130 are completely grounded to eliminate both the AC and DC components of the signal being outputted to the terminal Vout.

FIG. 4 is a detailed circuit diagram showing the CRT screen protecting device of FIG. 3 according to the embodiments of the present invention.

In FIG. 4, reference numerals R1'-R16' denote resistors, Q1'-Q13' denote transistors, I1 and I2 are constant current sources, D1' is a diode, and ZD1' is a Zener diode. Here, it should be particularly noted that the collector of transistor Q11' is connected to the base of transistor Q7'.

The operation of the device constructed as shown in FIG. 4 will be described below.

When the video signal is received via the input terminal Vin, the signal is amplified in transistor Q1' and supplied to transistor Q4'. The collector of transistor Q4' receives the voltage Vcc through transistors Q2' and Q3'. An output of the first amplifying circuit 110, therefore, is provided from the collector of transistor Q3'.

At this time, a voltage drop across the resistor R4' arising from a difference between the base voltages V1 and V2 of transistors Q2' and Q3' is varied. By varying the base voltages V1 and V2, the gain of the first amplifying circuit 110 changes. When the contrast voltage from the contrast section 140 is increased by adjusting a terminal voltage Vv of the variable voltage device 150, the relationship V1>>V2 is obtained. Then the collector current of transistor Q3' is increased to boost the voltage drop across the resistor R4', which increases the gain of the first amplifying circuit 110. If the contrast voltage is lowered, the operation is carried out in the reverse way. That is, the gain of the first amplifying circuit 110 decreases.

The signal passing through the first amplifying circuit 110 has a low DC level which is amplified in transistor Q6' of the second amplifying circuit 120. Then the signal is supplied to the terminal Vout via transistors Q7', Q8', Q9', and Q10' of the buffer circuit 130. The output signal includes a DC voltage of the input stage multiplied by the gain of the first and second amplifying circuits 110 and 120. Therefore, under the normal operation of the device, the DC voltage is also present at the output stage.

However, when the power is cut off because the user turned off the TV or monitor, the Vcc voltage is lowered. Since the base voltage Vb of transistor Q13' of the Vcc voltage sensing section 100 is fixed and the base voltage Vb of transistor Q12' is decreased according to the resistance ratio of resistors R11' and R12', the base voltage of transistor Q12' becomes less than the base voltage of transistor Q13' (Vb(Q12')<Vb(Q13')), which causes transistor Q12' to supply current to the base of transistor Q11'.

Therefore, transistor Q11' is selectively turned on to decrease the base voltage of transistor Q7' so that the output of the second amplifying circuit 120 and the input of the buffer circuit 130 are grounded and, further, both the video signal (AC) and DC component thereof are eliminated to zero at the output of the buffer circuit 130.

As a result, when the T.V. or monitor is turned off, the picture gradually disappears without forming a spot, and the abrupt brightness occurring during the power cut-off stage does not occur. Consequently, the CRT screen is protected more effectively and more completely.

While the present invention has particularly shown and described with reference to particular embodiments thereof, it would be understood by those skilled in the art that various changes in form and details may be affected therein without departing from the spirit and scope of the invention by defined by the appended claims.

What is claimed is:

1. A device for protecting a cathode ray tube screen, comprising:

amplifying means for amplifying a video signal input thereto and outputting an amplified signal;

buffer means for buffering the amplified signal and generating an output signal for a screen; and detection means for eliminating AC and DC components of the amplified signal output from the amplifying means so as to eliminate formation of a spot on the screen during a power cut-off stage, wherein the detection means includes a transistor connected at an input stage of the buffer means for grounding both the AC and DC components of the amplified signal output from the amplifying means.

2. A device of claim 1, wherein the detection means includes:

a voltage sensing circuit for detecting a voltage drop in a Vcc voltage during the power cut-off stage and generating a detection signal based on the detection, the transistor being turned on by receiving the detection signal from the voltage sensing circuit.

3. A device of claim 2, wherein a base of the transistor receives the detection signal from the voltage sensing circuit and a collector of the transistor is connected to an input of the buffer means.

4. A device of claim 1, wherein the amplifying means includes:

a first amplifying circuit for amplifying the video signal input thereto, and a second amplifying circuit connected to the first amplifying circuit for amplifying a signal output from the first amplifying circuit.

5. A device of claim 4, further comprising:

a variable voltage device for generating a varying voltage signal; and a contrast circuit for controlling an amplification magnitude of the first amplifying circuit based on the variable voltage signal from the variable voltage device.

6. A device of claim 5, wherein the first amplifying circuit includes at least two transistors connected to each other so that the contrast circuit varies the base voltages of the at least two transistors to control the amplification magnitude of the first amplifying circuit.

7. A device of claim 4, wherein the second amplifying circuit includes:

a first transistor for receiving the signal output from the first amplifying circuit, and a second transistor for generating the amplified signal of the second amplifying circuit.

8. A device of claim 7, wherein the collector of the second transistor is directly connected to the collector of the transistor which grounds the AC and DC components of the amplified signal output from the amplifying means.

9. A device of claim 1, wherein the buffer means includes a plurality of transistors connected in a cascade fashion, for generating the output signal for the screen without amplification.

10. A method of protecting a cathode ray tube screen, comprising the steps of:

amplifying by amplifying means a video signal input thereto and outputting an amplified signal;

buffering the amplified signal and generating an output signal for a screen; and eliminating AC and DC components of the amplified signal so as to eliminate formation of a spot on the screen during a power cut-off stage, wherein the eliminating step includes the steps of connecting a transistor at an input stage of the buffering step, and grounding both the AC and DC components of the amplified signal output at the amplifying step.

11. A method of claim 10, wherein the eliminating step includes the step of:

detecting a voltage drop in a Vcc voltage during the power cut-off stage and generating a detection signal based on the detection.

12. A method of claim 11, wherein the connecting step includes the steps of:

connecting a base of the transistor to receive the detection signal, and connecting a collector of the transistor to the input stage of the buffering step.

13. A method of claim 10, wherein the amplifying step includes the steps of:

first amplifying the video signal input to the amplifying means, second amplifying the signal amplified at the first amplifying step, and generating the amplified signal of the amplifying step after the second amplifying step.

14. A method of claim 13, further comprising the steps of:

generating a varying voltage signal; and controlling an amplification magnitude of the first amplifying step based on the generated variable voltage signal.

15. A method of claim 14, wherein the first amplifying step includes the steps of:

providing at least two transistors connected to each other, and varying base voltages of the two transistors using the variable voltage signal to control the amplification magnitude of the first amplifying step.

16. A method of claim 13, wherein the second amplifying step includes the steps of:

providing a first transistor for receiving the signal amplified at the first amplifying step, and providing a second transistor for generating the amplified signal of the second amplifying step.

17. A method of claim 16, wherein the eliminating step includes the steps of:

connecting a collector of the second transistor to the transistor connected at the input stage of the buffering step, and grounding AC and DC components of a signal at the collector of the second transistor by turning on said transistor connected at the input stage.

18. A method of claim 10, wherein the buffering step includes the steps of:

connecting a plurality of transistors in a cascade fashion, and generating the output signal for the screen without amplification.

19. A device for protecting a cathode ray tube (CRT) screen, comprising:

amplifying means for amplifying a video signal input thereto and outputting an amplified signal;

buffer means for buffering the amplified signal and generating an output signal for a screen; and detection means for grounding AC and DC components of the amplified signal output from the amplifying means, so as to eliminate formation of a spot on the screen during a power cut-off stage.

20. A method of protecting a cathode ray tube (CRT) screen, comprising the steps of:

amplifying a video signal to output an amplified signal;

buffering the amplified signal to generate an output signal for a screen; and grounding AC and DC components of the amplified signal output at the amplifying step, so as to eliminate formation of a spot on the screen during a power cut-off stage.

* * * * *